US012705424B2

(12) United States Patent
Sivashanmugam et al.

(10) Patent No.: US 12,705,424 B2
(45) Date of Patent: Aug. 11, 2026

(54) AI BASED AUTOCOMPLETE FOR NETWORK NODE CONFIGURATION

(71) Applicant: Parallel Wireless, Inc., Nashua, NH (US)

(72) Inventors: Murli Sivashanmugam, Bangalore (IN); Amod Mishra, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 967 days.

(21) Appl. No.: 17/703,411

(22) Filed: Mar. 24, 2022

(65) Prior Publication Data

US 2022/0309243 A1 Sep. 29, 2022

Related U.S. Application Data

(60) Provisional application No. 63/165,199, filed on Mar. 24, 2021.

(51) Int. Cl.

| | |
|---|---|
| ***G06F 40/274*** | (2020.01) |
| ***G06F 3/0481*** | (2022.01) |
| ***G06F 40/284*** | (2020.01) |

(52) U.S. Cl.
CPC .......... *G06F 40/274* (2020.01); *G06F 3/0481* (2013.01); *G06F 40/284* (2020.01)

(58) Field of Classification Search
CPC ... H04L 5/00; H04L 1/00; H04L 27/01; H04L 25/03; H04L 27/26; H04L 5/14; H04L 1/18; H04L 1/16; H04L 67/10; H04L 12/66; H04L 41/046; H04L 41/08; H04L 41/0806; H04L 43/0817; H04L 67/1006; H04L 67/1008; H04L 12/28; H04L 27/00; H04L 41/06; H04L 41/0631; H04L 41/0803; H04L 41/5009
See application file for complete search history.

(56) References Cited

U.S. PATENT DOCUMENTS

| | | | | |
|---|---|---|---|---|
| 11,181,988 | B1 * | 11/2021 | Bellegarda | G06F 3/04886 |
| 2014/0104177 | A1 * | 4/2014 | Ouyang | G06F 3/04842 345/168 |

(Continued)

OTHER PUBLICATIONS

Github—"Tabnine For Sublime", tabnine-sublime / README.md, Dec. 30, 2020, downloaded Jun. 25, 2025.

(Continued)

*Primary Examiner* — Rayeez R Chowdhury
(74) *Attorney, Agent, or Firm* — Michael Y. Saji; Ashley Patel

(57) ABSTRACT

Systems, computer readable media and methods are disclosed for providing Artificial Intelligence (AI) based Auto-Complete for network node configuration. In one embodiment a method includes predicting a configuration to use based on a model, wherein predicting a configuration comprises: accepting user inputs; converting, by a tokenizer, the user inputs into word tokens; taking, by the model, the word tokens as input sequences and using transfer learning methods calculating parameters of occurrences of next words; and ranking the word tokens according to values of their parameters wherein word tokens with a highest value are suggested to a user for auto completion of the network node configuration.

20 Claims, 4 Drawing Sheets

(56) References Cited

U.S. PATENT DOCUMENTS

2014/0281947 A1* 9/2014 Zitnick, III ........... G06T 11/203 715/268
2014/0379881 A1* 12/2014 Bradley .................. H04L 41/08 709/221
2017/0265189 A1* 9/2017 Stephenne ............ H04W 72/51
2018/0357051 A1* 12/2018 Puszkiewicz ....... G06F 9/45512
2019/0044802 A1* 2/2019 Gibbon ................... H04L 43/20
2019/0320934 A1* 10/2019 Odry .................... A61B 5/7264
2020/0104427 A1* 4/2020 Long ........................ G06N 3/04
2020/0210465 A1* 7/2020 Upadhyay ............... G06F 40/53
2021/0064657 A1* 3/2021 Gopalan ................. G06F 18/24
2021/0351832 A1* 11/2021 Zhang ................... H04L 5/1461
2021/0365632 A1* 11/2021 Trim ...................... G06N 20/00
2023/0115368 A1* 4/2023 Parichehrehteroujeni .................. H04W 74/0833 706/46

OTHER PUBLICATIONS

GitHub—"Kite Autocomplete Plugin for Visual Studio Code", Mar. 10, 2021, downloaded Jun. 25, 2025.

* cited by examiner

AI BASED AUTOCOMPLETE FOR NETWORK NODE CONFIGURATION

CROSS-REFERENCE TO RELATED APPLICATIONS

This application claims priority under 35 U.S.C. § 119(e) to U.S. Provisional Pat. App. No. 63/165,199, filed Mar. 24, 2021, titled "AI Based AutoComplete for Network Node Configuration" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Auto completion is a feature widely used in code editors and command line configuration interface to help user quickly type the next possible keywords. But so far auto completion works based on rule-based software using syntax and grammars. With the advancement in AI it is now possible to predict the next most likely configuration based on configuration samples used in multiple other setups. New age code auto completion tools like https://kite.com/or https://tabnine.com uses AI model to learn and predict next code that the user is expected to type and provide it as an auto completion suggestion. We can use the similar approach for competing networking configuration of a node instead of the code.

SUMMARY

At different points of configuration tree instead of just providing key word suggestions, if the software could suggest the next probable configuration line, it would make things easier for the user to understand what and how to configure the next lines.

A method is disclosed for providing Artificial Intelligence (AI) based AutoComplete for network node configuration. In one embodiment a method includes predicting a configuration to use based on a model, wherein predicting a configuration comprises: accepting user inputs; converting, by a tokenizer, the user inputs into word tokens; taking, by the model, the word tokens as input sequences and using transfer learning methods calculating parameters of occurrences of next words; and ranking the word tokens according to values of their parameters wherein word tokens with a highest value are suggested to a user for auto completion of the network node configuration.

In another example embodiment, a non-transitory computer-readable medium contains instructions for providing Artificial Intelligence (AI) based AutoComplete for network node configuration, which, when executed, cause the system to perform steps including: predicting a configuration to use based on a model, wherein predicting a configuration comprises: accepting user inputs; converting, by a tokenizer, the user inputs into word tokens; taking, by the model, the word tokens as input sequences and using transfer learning methods calculating parameters of occurrences of next words; and ranking the word tokens according to values of their parameters wherein word tokens with a highest value are suggested to a user for auto completion of the network node configuration.

In another example embodiment a system includes an interface for accepting user inputs; a tokenizer in communication with the interface, converting the user inputs into word tokens; a model, in communication with the tokenizer, taking the word tokens as input sequences and using transfer learning methods calculating parameters of occurrences of next words; a prediction filter, in communication with the model, ranking the word tokens according to values of their parameters and wherein word tokens with a highest value are suggested to a user for auto completion of the network node configuration.

DETAILED DESCRIPTION

Configuring a network node is a tedious and error prone manual process. A network node like EPC or MSC will have few hundreds of parameters to configure. To assist the user in configuration, the CLI interfaces provide keyword suggestions using which user can view all possible configurations that can be configured in the current configuration context. Even with keyword suggestion user is left with lots of options and user typically takes a wild guess on what to configure next. Instead of just suggesting all possible next keywords, the software suggests the next most probable configuration line with parameters substituted, which goes a long way in easing the user pain in configuring a network node.

A network node usually has a Graphical User Interface (GUI) and a Command Line Interface (CLI) for configuring its software. Since the number of configurable items are huge, CLI is the most preferred way of configuration. In the CLI interface user configures the node one line at a time. Each line usually sets or update a configuration context where related parameter are configured one line at a time. This usually follows a dept first tree order in which one line is dependent on the previous lines. It becomes a tedious task for the user to identify how and what to configure next in a configuration tree.

At different points of configuration tree instead of just providing key word suggestions, if the software could suggest the next probable configuration line, it would make things easier for the user to understand what and how to configure the next lines.

Figure 1:
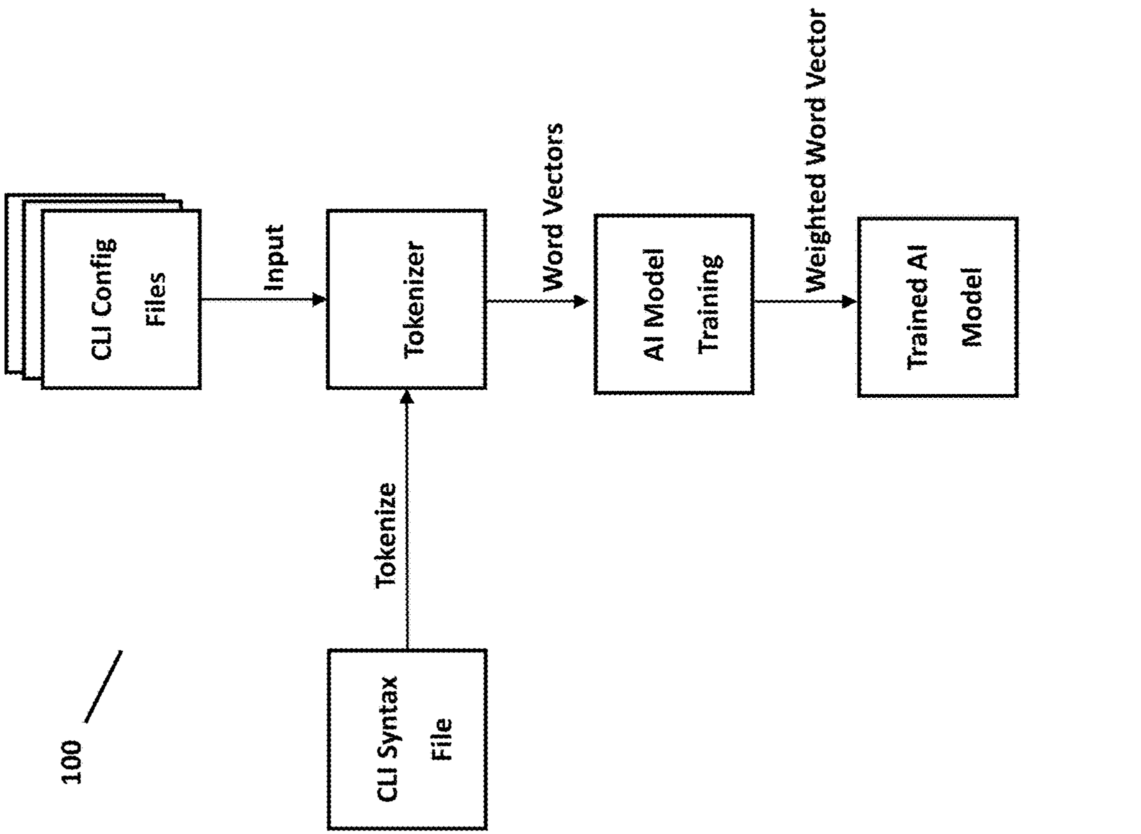
FIG. 1 is a diagram of a method for providing Artificial Intelligence (AI) based AutoComplete for network node configuration, in accordance with some embodiments.

FIG. 1 is a diagram 100 showing the components and steps used for providing Artificial Intelligence (AI) based AutoComplete model training for network node configuration. This is running at cell network configuration node, and may be in communication with cell network edge and/or base stations. The system receives input from reconfiguration or cell network edge. The system creates output formatted for core network node or base station node. AutoComplete takes into account a state machine or rule tree for which parameter values logically exclude other values.

Steps of Model Training:

CLI Syntax file/CLI config file: During Model training phase all the inputs provided via CLI Syntax file/CLI config file would be stored. Tokenizer: Tokenizer would convert each of the config line into word tokens. AI Model training: Word vectors received as input would be further processed to calculate AI parameters (weights and probabilities of the word vectors) using suitable machine learning algorithms. Trained AI Model: During this phase AI parameter of the trained model would be stored to be used to config predictions.

Figure 2:
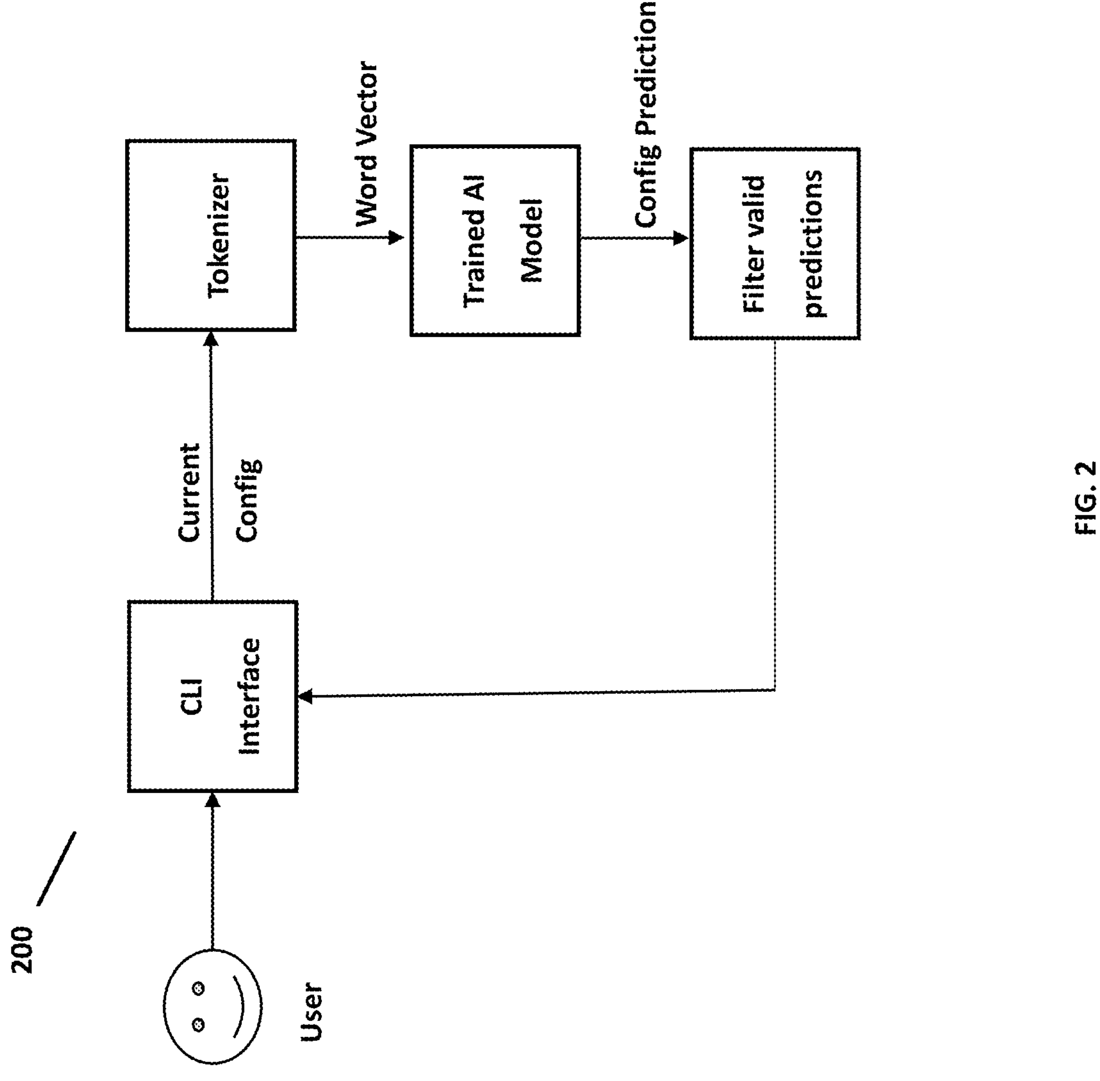
FIG. 2 is a diagram of a system for providing Artificial Intelligence (AI) based AutoComplete for network node configuration, in accordance with some embodiments.

FIG. 2 is a diagram 200 showing the components and steps used for providing Artificial Intelligence (AI) based AutoComplete for network node configuration.

Steps of Config Prediction:

CLI Interface: User inputs are accepted. Tokenizer: Tokenizer would convert user inputs into word tokens. Trained AI Model: Word tokens would be taken as input sequences and using transfer learning methods on trained AI model (Which was built during model training phase) params of occurrences of next words will be calculated. Filter valid predictions: Word tokens will be ranked according to values of their params and those with highest value would be suggested to the user for auto completion.

Figure 3:
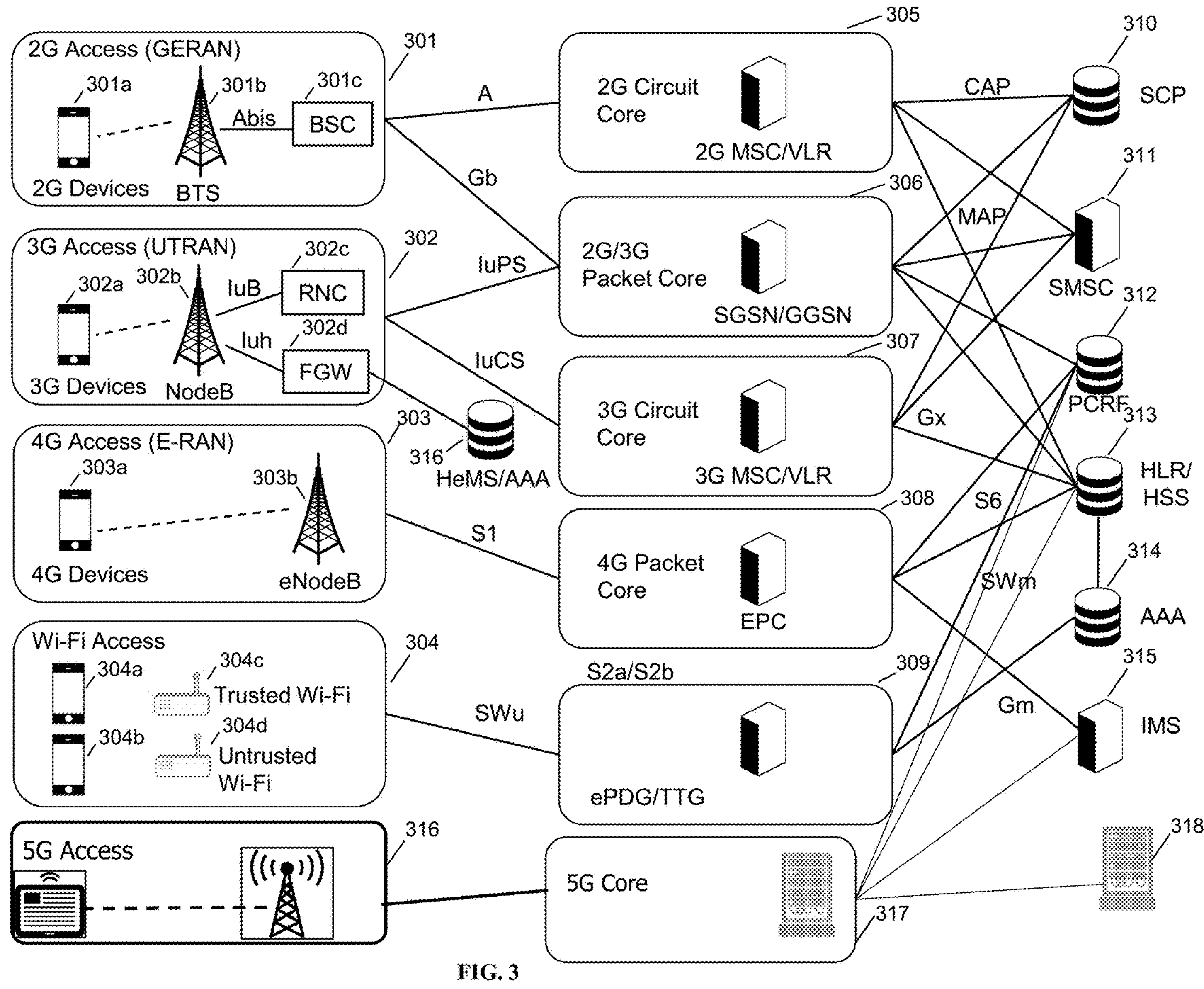
FIG. 3 is a schematic network architecture diagram for 3G and other-G prior art networks.

FIG. 3 is a schematic network architecture diagram for 3G and other-G prior art networks. The diagram shows a plurality of "Gs," including 2G, 3G, 4G, 5G and Wi-Fi. 2G is represented by GERAN 301, which includes a 2G device 301*a*, BTS 301*b*, and BSC 301*c*. 3G is represented by UTRAN 302, which includes a 3G UE 302*a*, nodeB 302*b*, RNC 302*c*, and femto gateway (FGW, which in 3GPP namespace is also known as a Home nodeB Gateway or HNBGW) 302*d*. 4G is represented by EUTRAN or E-RAN 303, which includes an LTE UE 303*a* and LTE eNodeB 303*b*. Wi-Fi is represented by Wi-Fi access network 304, which includes a trusted Wi-Fi access point 304*c* and an untrusted Wi-Fi access point 304*d*. The Wi-Fi devices 304*a* and 304*b* may access either AP 304*c* or 304*d*. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301*c* is required for Abis compatibility with BTS 301*b*, while for the 3G UTRAN, an RNC 302*c* is required for Iub compatibility and an FGW 302*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
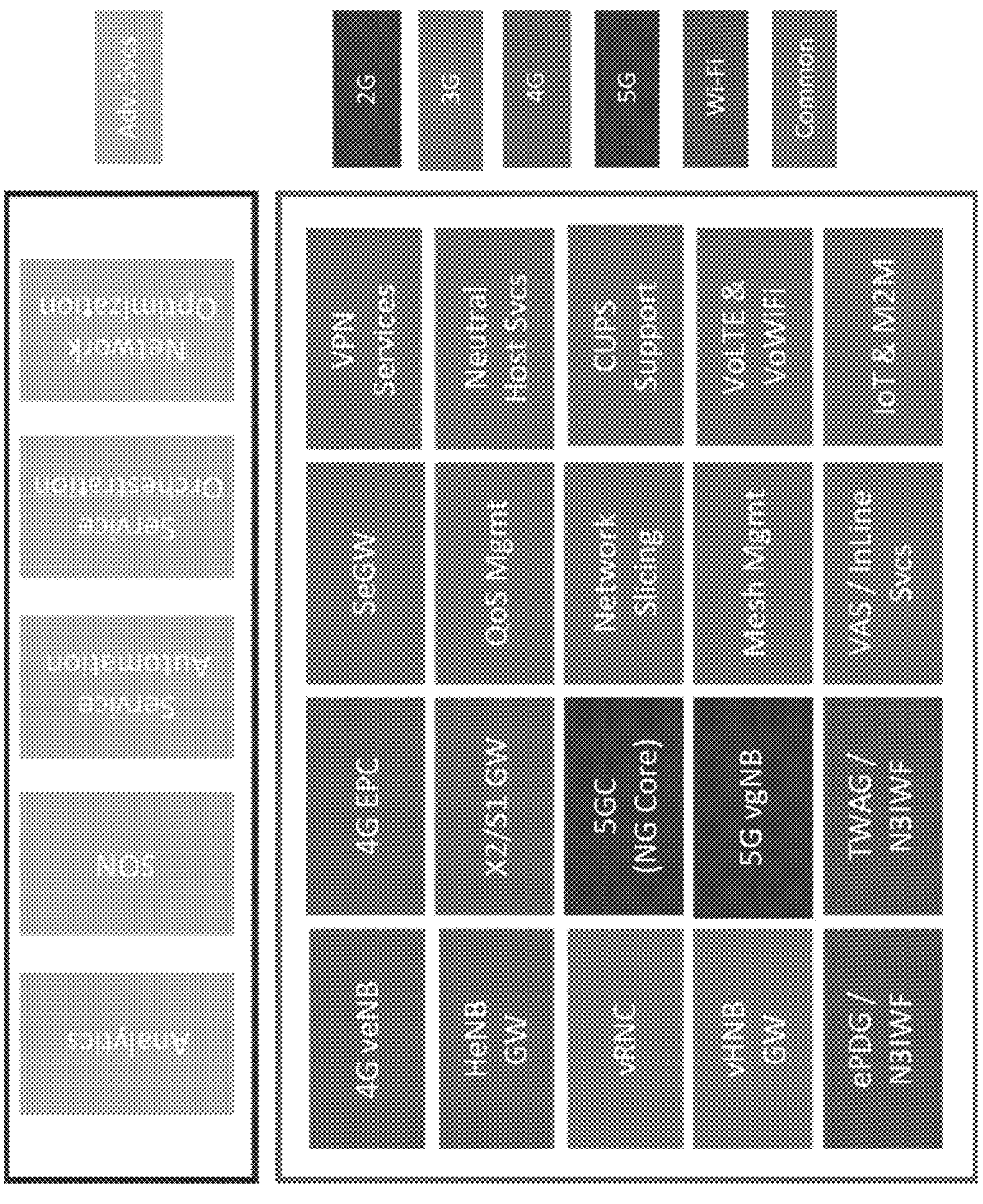
FIG. 4 is a diagram showing a fusion application suite, in accordance with some embodiments.

Referring now to FIG. 4, diagram 400 shows GiLAN/VAS Suite anywhere in the Network: Centralized and/or at the Edge. The "Gi" (Gateway-Internet) LAN interface (referred to as the sGi-LAN in 4G networks) is the reference point defined by the 3rd Generation Partnership Project (3GPP) as the interface between a communications service provider's mobile packet gateway and an external packet data network (such as the Internet).

GiLAN/Value Added Services. Critical component for any Core Network, Centralized or Distributed. Network Intelligence lies with the Core, benefits seen Network-wide. Enabler for Network Monetization for MNOs. Savings in TCO+Increased User stickiness justifies investment in these VAS features in Core/EdgeCore.

GiLAN differentiation: Analytics-driven, Converged Data Plane Analytics (data from HNG & EdgeCore), Edge and Centralized GiLAN options, and Intelligent Service Chaining Example: Use Analytics to predict user's behavior to allocate resources e.g. if user does streaming at a particular time and user is paying for premium service bandwidth is managed in advance for them to do good quality streaming.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method of providing Artificial Intelligence (AI) based AutoComplete for network node configuration, comprising:

predicting a configuration to use for a network node based on a model, wherein predicting the configuration comprises:

accepting user inputs;

converting, by a tokenizer, the user inputs into word tokens;

taking, by the model, the word tokens as input sequences and using transfer learning methods calculating parameters of occurrences of next words; and ranking the word tokens according to values of their parameters wherein word tokens with a highest value are suggested to a user for auto completion of the network node configuration.

2. The method of claim 1 wherein accepting user inputs comprises accepting user inputs at a Command Line Interface (CLI) interface.

3. The method of claim 1 wherein accepting user inputs comprises accepting user inputs at a Graphical User Interface (GUI).

4. The method of claim 1 further comprising suggesting a next probable configuration line.

5. The method of claim 1 wherein the model is a trained model.

6. The method of claim 5 wherein a cell network configuration node, coupled to the network node, provides the trained model by:

providing inputs to a cell network configuration node tokenizer from a CLI syntax file and from a CLI configuration file;

converting, by the cell network configuration node tokenizer, configuration lines into word tokens at the cell network configuration node;

processing the word tokens at the cell network configuration node received from the cell network configuration node tokenizer to calculate AI parameters; and storing the AI parameters to be used for network node configuration predictions.

7. The method of claim 1 wherein the network node takes into account a state machine or rule tree for which parameter values logically exclude other values.

8. A non-transitory computer-readable medium containing instructions for providing Artificial Intelligence (AI) based AutoComplete for network node configuration, which, when executed, cause the network node to perform steps including:

predicting a configuration to use for a network node based on a model, wherein predicting the configuration comprises:

accepting user inputs;

converting, by a tokenizer, the user inputs into word tokens;

taking, by the model, the word tokens as input sequences and using transfer learning methods calculating parameters of occurrences of next words; and ranking the word tokens according to values of their parameters wherein word tokens with a highest value are suggested to a user for auto completion of the network node configuration.

9. The computer-readable medium of claim 8 wherein the instructions for accepting user inputs comprises instructions for accepting user inputs at a Command Line Interface (CLI) interface.

10. The computer-readable medium of claim 8 wherein the instructions for accepting user inputs comprises instructions for accepting user inputs at a Graphical User Interface (GUI).

11. The computer-readable medium of claim 8 further comprising instructions which, when executed, cause the network node to perform a step of suggesting a next probable configuration line.

12. The computer-readable medium of claim 8 wherein the model is a trained model.

13. The computer-readable medium of claim 12 wherein a cell network configuration node, coupled to the network node, provides the trained model by:

providing inputs to a cell network configuration node tokenizer from a CLI syntax file from a CLI configuration file;

converting, by the cell network configuration node tokenizer, configuration lines into word tokens at the cell network configuration node;

processing the word tokens at the cell network configuration node received from the cell network configuration node tokenizer to calculate AI parameters; and storing the AI parameters to be used for network node configuration predictions.

14. The computer-readable medium of claim 8 further comprising instructions for taking into account a state machine or rule tree for which parameter values logically exclude other values.

15. A system for providing Artificial Intelligence (AI) based AutoComplete for network node configuration comprising:

an interface, including a memory coupled to a processor, accepting user inputs;

a tokenizer in communication with the interface, converting the user inputs into word tokens;

a model, in communication with the tokenizer, taking the word tokens as input sequences and using transfer learning methods calculate parameters of occurrences of next words; and a prediction filter, in communication with the model, ranking the word tokens according to values of their parameters and wherein word tokens with a highest value are suggested to a user for auto completion of the network node configuration for a network node.

16. The system of claim 15 wherein the interface comprises one of a Command Line Interface (CLI) interface and a Graphical User Interface (GUI).

17. The system of claim 15 wherein the prediction filter further to suggests a next probable configuration line.

18. The system of claim 15 wherein the model is a trained model.

19. The system of claim 18 wherein a cell network configuration node, coupled to the network node, provides the trained model by:

providing inputs to a cell network configuration node tokenizer from a CLI syntax file and from a CLI configuration file;

converting, by the cell network configuration node tokenizer, configuration lines into word tokens at the cell network configuration node;

processing the word tokens at the cell network configuration node received from the cell network configuration node tokenizer to calculate AI parameters; and storing the AI parameters to be used for network node configuration predictions.

20. The system of claim 15 wherein the network node takes into account a state machine or rule tree for which parameter values logically exclude other values.

* * * * *